(12) United States Patent
Andreoli-Fang

(10) Patent No.: US 11,218,899 B2
(45) Date of Patent: Jan. 4, 2022

(54) SYSTEM AND METHOD FOR GRANT ASSIGNMENT

(71) Applicant: CABLE TELEVISION LABORATORIES, INC., Louisville, CO (US)

(72) Inventor: Jennifer Andreoli-Fang, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/436,245

(22) Filed: Jun. 10, 2019

(65) Prior Publication Data

US 2019/0297522 A1 Sep. 26, 2019

Related U.S. Application Data

(63) Continuation of application No. 15/447,419, filed on Mar. 2, 2017, now Pat. No. 10,321,351.

(51) Int. Cl.
*H04L 12/28* (2006.01)
*H04W 28/02* (2009.01)
*H04W 72/12* (2009.01)

(52) U.S. Cl.
CPC ..... *H04W 28/0247* (2013.01); *H04L 12/2854* (2013.01); *H04L 12/2865* (2013.01); *H04W 72/1294* (2013.01); *H04W 28/0278* (2013.01); *Y02D 30/50* (2020.08)

(58) Field of Classification Search
None
See application file for complete search history.

(56) References Cited

U.S. PATENT DOCUMENTS

| | | | |
|---|---|---|---|
| 6,157,614 A | 12/2000 | Pasternak et al. | |
| 7,899,451 B2 | 3/2011 | Hu et al. | |
| 8,867,490 B1 | 10/2014 | Krishna et al. | |
| 8,897,312 B2 | 11/2014 | Pesola | |
| 8,929,319 B2 * | 1/2015 | Anderson | H04L 5/0037 370/329 |
| 9,754,454 B2 | 9/2017 | Onorato et al. | |
| 10,321,351 B2 * | 6/2019 | Andreoli-Fang | H04L 12/2854 |
| 2005/0159162 A1 | 7/2005 | Park | |
| 2008/0020797 A1 | 1/2008 | Denney et al. | |

(Continued)

OTHER PUBLICATIONS

International Search Report in PCT/US17/21918, dated Aug. 16, 2017.

*Primary Examiner* — Phuongchau Ba Nguyen
(74) *Attorney, Agent, or Firm* — David Daniel Smith; Cable Television Laboratories, Inc.

(57) ABSTRACT

A system and method for forming bulk requests and prioritized grant assignments in a mixed network environment utilizing a request-grant or similar protocol and prioritized grouping of data as a function of Logical Channel Group (LCG). The systems and methods generate a second network bulk request from a plurality of first network BSRs, which causes the generation of a bulk grant. Furthermore, the systems and methods optionally group data from a plurality of UE, each having a data siloed into logical channel groups, and reorganizing the data into a first priority LCG data set comprising the LCG0 data from each of the plurality of UEs, a second priority LCG data set comprising the LCG1 data from each of the plurality of UEs, etc.

15 Claims, 9 Drawing Sheets

(56) References Cited

U.S. PATENT DOCUMENTS

| | | |
|---|---|---|
| 2009/0156213 A1 | 6/2009 | Spinelli et al. |
| 2009/0304055 A1 | 12/2009 | Nino et al. |
| 2010/0118752 A1 | 5/2010 | Suzuki et al. |
| 2010/0172368 A1 | 7/2010 | Eng |
| 2010/0284314 A1 | 11/2010 | Pelletier et al. |
| 2012/0287784 A1 | 11/2012 | Shalzkamer et al. |
| 2012/0321312 A1 | 12/2012 | Timm et al. |
| 2013/0010686 A1 | 1/2013 | Shalzkamer et al. |
| 2013/0142157 A1 | 6/2013 | Pesola |
| 2013/0242726 A1* | 9/2013 | Zhu .................. H04W 72/1273 370/229 |
| 2013/0287784 A1 | 10/2013 | Brouxhon et al. |
| 2014/0056130 A1 | 2/2014 | Grayson et al. |
| 2014/0328190 A1 | 11/2014 | Lord et al. |
| 2015/0358838 A1 | 12/2015 | Wei et al. |
| 2016/0142934 A1* | 5/2016 | Ahmadzadeh ........ H04W 72/04 370/328 |
| 2016/0262169 A1 | 9/2016 | Das et al. |
| 2017/0244539 A1 | 8/2017 | Hanna et al. |
| 2017/0265216 A1 | 9/2017 | Andreoli-Fang et al. |
| 2017/0280467 A1 | 9/2017 | Zhu et al. |
| 2017/0330408 A1 | 11/2017 | Onorato et al. |
| 2018/0069618 A1* | 3/2018 | Loehr ............... H04W 72/1263 |
| 2018/0255557 A1* | 9/2018 | Andreoli-Fang ............................ H04W 72/1294 |
| 2018/0279359 A1* | 9/2018 | Liu ....................... H04W 72/14 |
| 2019/0297522 A1* | 9/2019 | Andreoli-Fang ............................ H04W 28/0247 |

\* cited by examiner

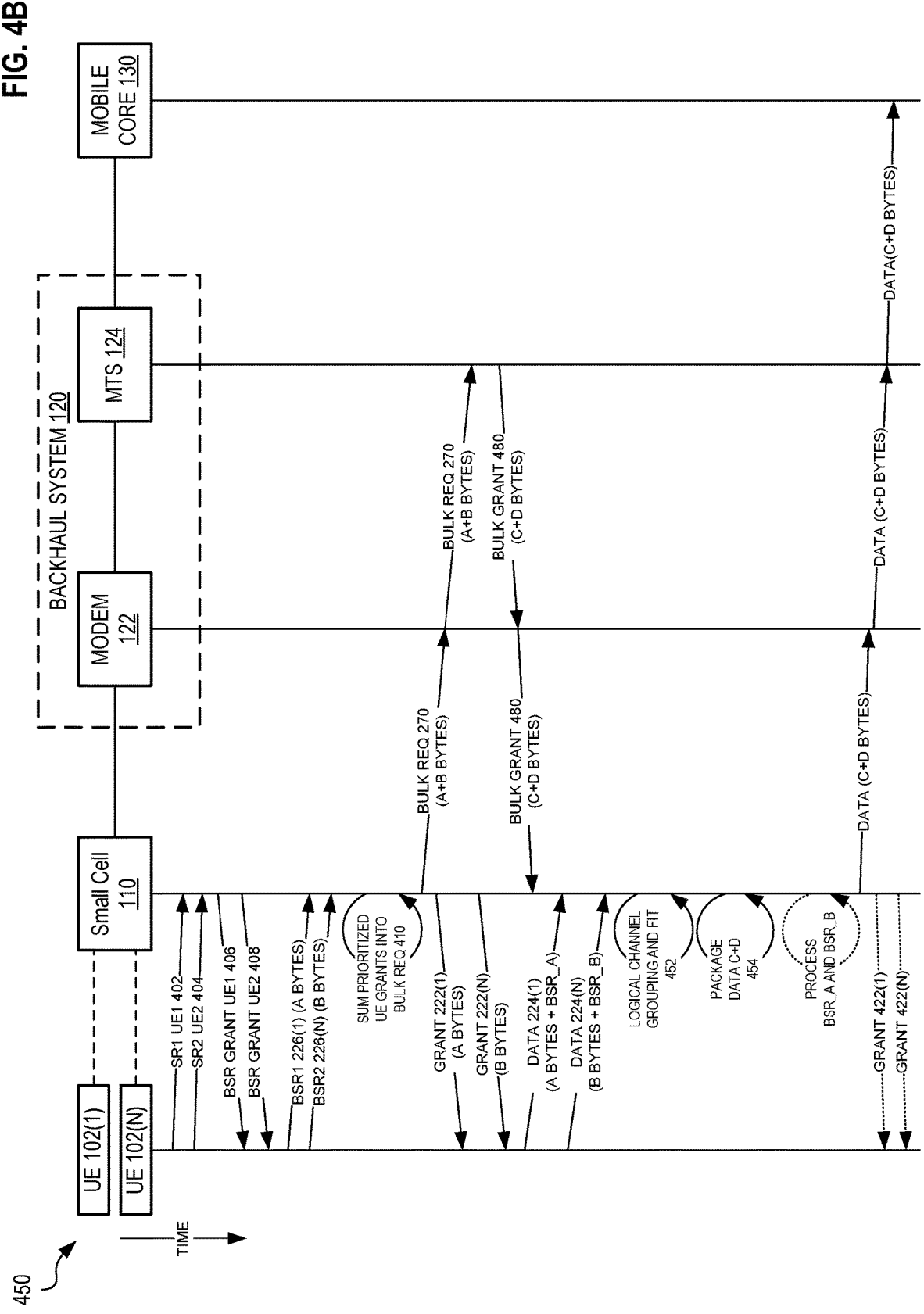

SYSTEM AND METHOD FOR GRANT ASSIGNMENT

CROSS-REFERENCE TO RELATED APPLICATION

This application is a continuation of U.S. patent application Ser. No. 15/447,419, filed Mar. 2, 2017, the entire content of which is incorporated herein by reference.

BACKGROUND

Mobile Network Operators (MNOs) provide wireless service to a variety of user equipment (UEs) and operate using a variety of techniques such as those found in 3G, 4G LTE networks. The wireless service network can consist of macro and/or small cells.

Some MNOs operate with Multi System Operators (MSOs) of the cable industry for backhauling traffic for wireless networks. The MSO packages the communications between the UE and the MNO via the MSOs protocol, for example Data Over Cable Service Interface Specification (DOCSIS).

Since the wireless and backhaul networks are controlled by separate entities, DOCSIS backhaul networks and wireless radio networks each lack visibility into the other's network operations and data. This causes the scheduling algorithms for the wireless and DOCSIS network to operate separately, which can result in serial operations during the transfer of data from UE to the mobile core. The DOCSIS network does not have insights into the amount and the priority of wireless data being backhauled, since this knowledge is only known to the wireless portion of the network.

SUMMARY OF THE INVENTION

Other embodiments contemplated utilizing an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of x-hauling traffic, examples include without limitation satellite operator's communication systems, Wi-Fi networks, optical networks, DOCSIS networks, MIMO communication systems, microwave communication systems, short and long haul coherent optic systems, etc. X-hauling is defined here as any one of or a combination of front-hauling, backhauling, and mid-hauling. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a modem, an Optical Network Units (ONU), a DSL unit, etc. collectively called a "modem." Further, to simplify description a protocol such as DOCSIS, EPON, RFOG, GPON, Satellite Internet Protocol, is called a "protocol."

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE INVENTION

FIG. 4B is a communication diagram for the present grant assignment process wherein a portion of the request (REQ) is granted, in an embodiment.

FIGS. 5 A-C is a method flow detailing one exemplary process for generating a bulk request for resources, in an embodiment.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below. For example, the following description is discussed as suggestive of an LTE-DOCSIS cooperative network for expediting a grant assignment for a wireless service through a request-grant based communication link between a user device (e.g., a UE) and a wireless core (also called herein a "first network core", e.g., a mobile core or Wi-Fi core). Generically, a LTE-DOCSIS cooperative network may be any first network-second network cooperative communication system and is not limited to either LTE or DOCSIS networks. For example, the present system and method may be used in a polling service based system, such as Real-Time Publish-Subscribe (RTPS). Polling is similar enough to a request-grant system that it may take advantage of the present invention. One difference between a request-grant system and a polling service system is polling occurs without having to contend with other devices when a request is sent. It will be appreciated that the present system and method for prioritized grant assignment in wireless services may equally be applied in systems utilizing microcells, picocells, macrocells, Wi-Fi, satellite communication systems, optical backhaul systems (EPON, GPON, RFOG), MU-MIMO, laser communication, and even aerial vehicles such as unmanned aerial vehicles (UAV) and balloons that provide wireless and/or laser communication. That is, the present invention may be used in many wireless-to-backhaul systems where at least one of the wireless system or backhaul system utilizes a request-grant protocol for data transmission.

Figure 1:
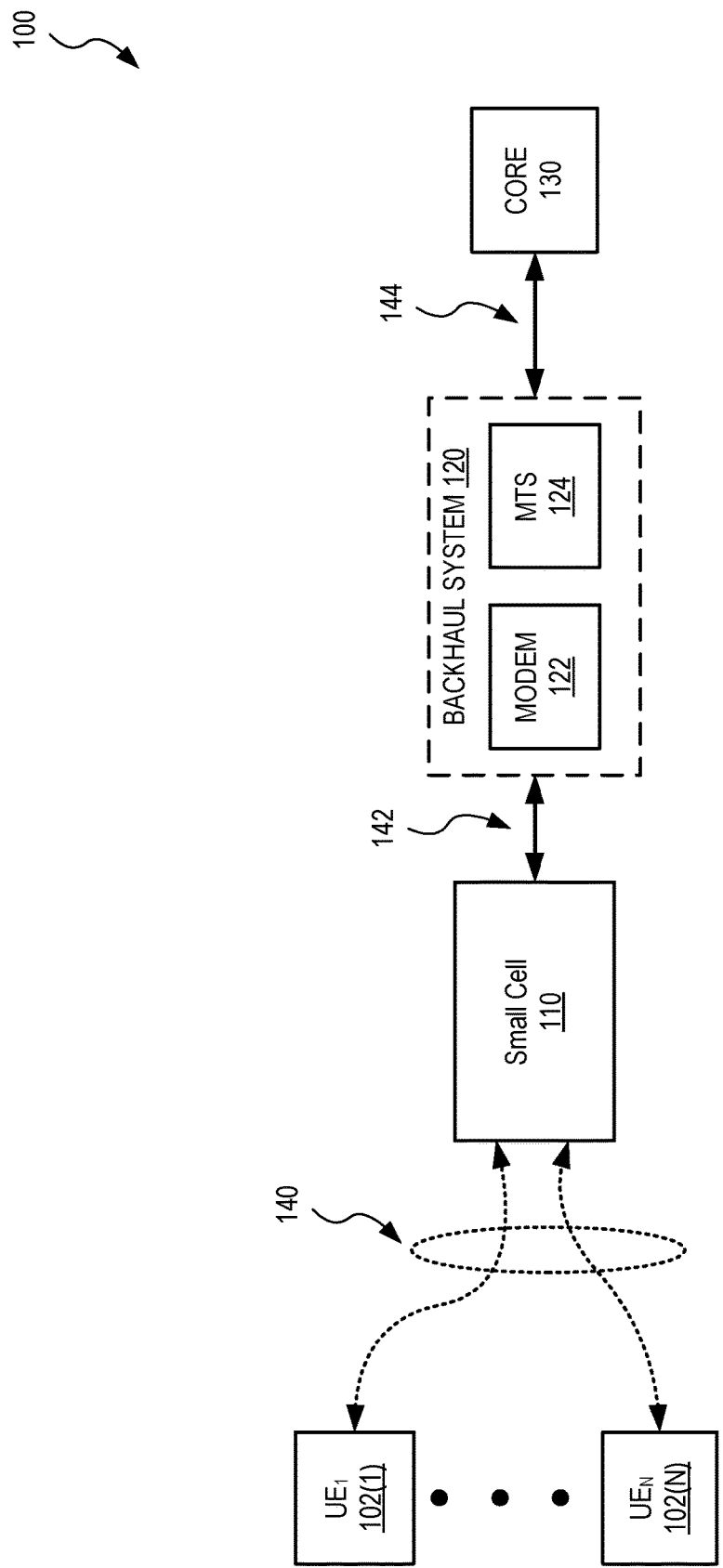
FIG. 1 shows one exemplary system configured to implement the present prioritized grant assignment process, in an embodiment.

FIG. 1 shows one exemplary communication system 100 in which the present prioritized grant assignment system and method may be utilized.

As shown, communication system 100 includes User Equipment (UEs) 102(1)-102(n), a small cell 110, a backhaul system 120 configured with a modem 122 and a modem terminal system (MTS) 124, and a wireless core 130 (hereinafter core 130). It will be understood that UEs 102(1)-102(n) may be any user equipment or radio terminal, such as cell phones, laptop computers, tablet computers, wearables, Internet of Things (IoT) devices, a wireless equipped motor vehicle, etc. In addition, small cell 110 may be any wireless access base station, for example, an eNodeB, a Wi-Fi access point, etc. Furthermore, UE's 102's and small cell 110 may be configured with one or more wireless communication protocols, example of which include but are not limited to Wi-Fi, 3G, 4G, 5G, and Long Term Evolution (LTE) communication protocols. Core 130 may be any core that services radio terminals similar to UEs 102, such as a mobile core, a Wi-Fi core, or the like. As discussed above, backhaul system 120 may be any system capable of wireless backhauling data.

In an embodiment, small cell 110 and modem 122 are co-located. In such a version, small cell 110 and modem 122 may be configured within the same enclosure.

It will be understood that MTS 124 may be formed as a single device or may be formed as more than one device. Alternatively, MTS 124 may be formed as a combination of real and virtual devices, virtual components, and/or virtualized functions. If virtualization is utilized, such virtual devices, components, and/or functions maybe executed within the backhaul system or may be implemented outside of the backhaul system.

UEs 102 are in wireless communication via communication link 140 with small cell 110. Small cell 110 is in wired or wireless communication with backhaul system 120 via communication link 142. Backhaul system 120 is in wired communication with core 130 via communication link 144.

As suggested above, the invention, in total or in part, may take the form of an entirely hardware implementation, an entirely software implementation or an embodiment containing both hardware and software elements. Embodiments utilizing network functions virtualization (NFV) and virtualized hardware, such as a virtualized MTS, virtualized modem, virtualized aspects of the MTS and/or modem, etc., are also contemplated. In one embodiment, the invention is implemented in whole or in part in software, which includes but is not limited to firmware, resident software, microcode, etc.

Figure 2A:
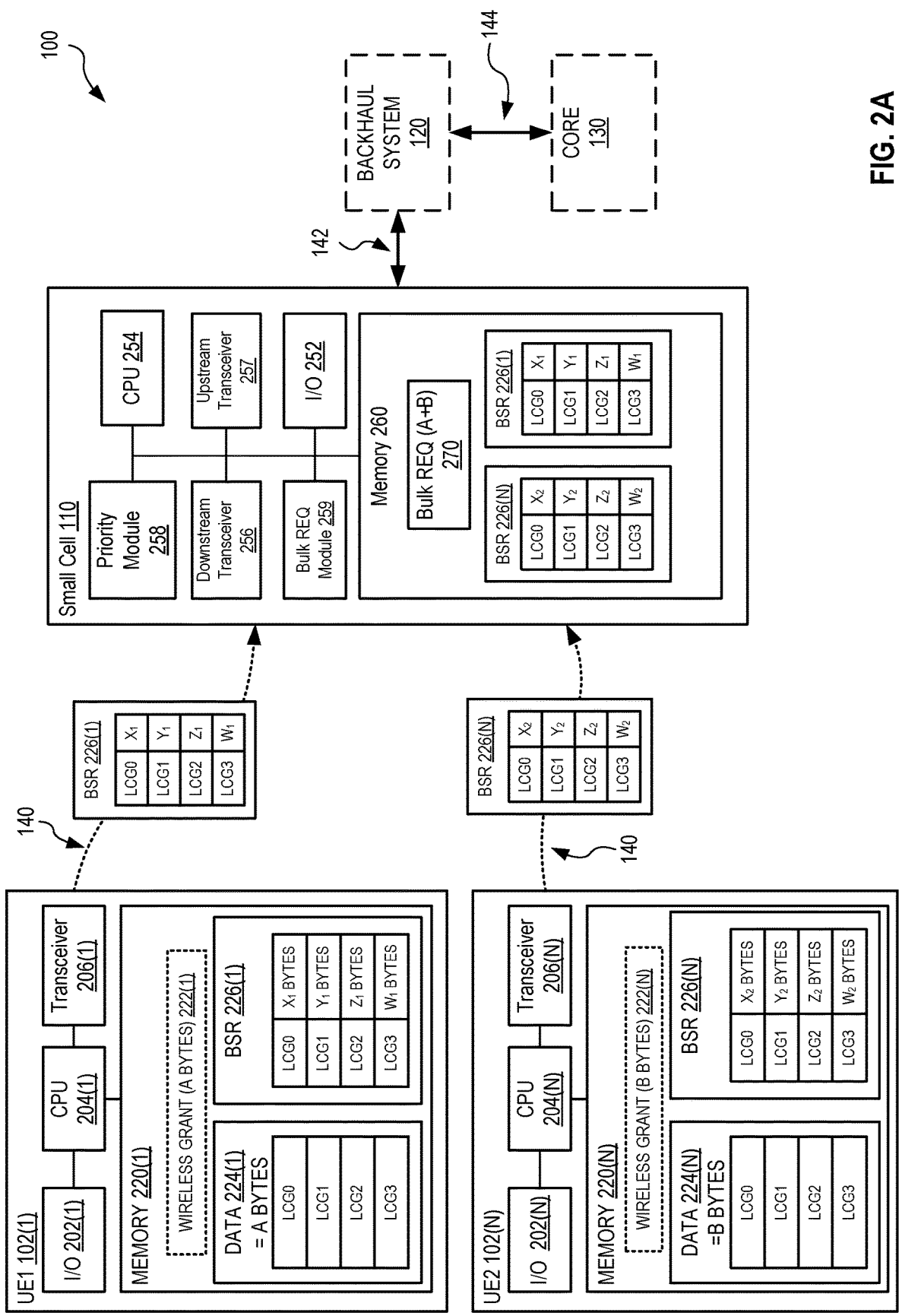
FIG. 2A is a more detailed view of the grant assignment system of FIG. 1 processing multiple buffer status reports (BSRs) to generate a bulk request (REQ) for resources from a connected backhaul system, in an embodiment.

FIG. 2A is a detailed view of some aspects of the prioritized grant assignment system of FIG. 1. System 100 of FIG. 2 is described here processing multiple buffer status reports (BSRs) 226 to generate a bulk request (REQ) 270 for resources from a connected backhaul system 120, in an embodiment.

Each UE 102(1)-(n) is configured with an input/output (IO) system 202, a CPU 204, a wireless transceiver 206, and a memory 220, all of which are communicatively coupled. More or fewer components may be incorporated within a UE 102 without departing from the scope herein. I/O 202 may be any device level input/output system, including but not limited to a keyboard, mouse, touch screen, display, tactic feedback system, monitors (e.g., heart rate, Global Positioning (GSP), activity sensor, accelerometer, any health monitoring system, position sensors as used in room scale virtual reality (VR), etc.), graphics cards, sound card, I/O chips and/or chip sets, etc. I/O 202 may also be removably and/or temporality coupled with UE 102. Processor 204 may be a processing unit including but not limited to one or more of a central processing unit, a microprocessing unit, a graphics processing unit (GPU), a multi-core processor, a virtual CPU, a control unit, an arithmetic logic unit, a parallel processing unit or system, etc. Transceiver 206 may be any or a plurality of wireless transceivers capable of wirelessly communication with the small cell 110 on one or more compatible wireless communication protocols. Memory 220 may be any non-transitory memory. Memory 220 may also be a plurality of cooperative memory components. Memory 220 may be implemented as or include one or more buffers. However memory 220 is organized BSR 226 describes at least a portion of it for purposes of requesting resources from one or more networks to transmit data stored therein.

Memory 220 stores at least a buffer status report (BSR) 226, a data 224 for transmission across backhaul system 120 to core 130, and one or more wireless grants 222. It will be understood that BSR 226(1), data 224(1), and wireless grant 222(1) are specific to UE 102(1) and BSR 226(n), data 224(n), and wireless grant 222(n) are specific to UE 102(n) and may be erased, written over, or moved to a secondary storage device (not shown) at a time determined by UE 102 or any decision making units within system 100, such as modem 122, MTS 124, and core 120. Wireless grants 222(1) and 222(n) are shown in dashed line to represent that they are only present after BSRs 226(1) and 226(n) are sent to and processed by small cell 110, which generates wireless grants 222(1) and 222(n) and transmits them back to UEs 102(1) and 102(n), respectively. This process may be seen at least in FIGS. 4A-B.

Data 224(1) and data 224(n) are of a certain size, shown here as having size of A bytes for data 224(a) and B bytes for data 224(n). Data in data 224 is organized by priority, for example into logical channel groups (LCG) 0-3. Logical channel grouping is the prioritization scheme utilized in the present embodiments shown here, but it would apparent to the skilled artisan that another prioritization scheme may be used without departing from the scope herein. Throughout the present description LCG0 is assigned the highest priority data, LCG 1 is assigned the next lowest priority, etc. Examples of data that would be placed into LCG0 are control messages specific to the wireless network, mission critical traffic, gaming traffic, or anything that requires the lowest latency. Examples of data that would be placed into LCG1 are voice or video traffic. Examples of data that would be placed into LCG2 are data traffic from such applications as web browsing. Examples of data that would be placed into LCG3 are low priority background traffic, examples of which include but are not limited to file uploads, file downloads, and software updates. BSRs 226(1)-(n) contain at least metadata describing the size of the data contained within each of their respective data 224 (1)-(n) such that any intermediate and/or receiving systems may utilize this metadata to provide a grant for all or a portion of the data in data 224(1)-(n). As will be discussed below, if the provided grant cannot accommodate all the data is a data 224 or the combination of data contained with a plurality of data 224s, then the system groups and data in prioritized the data based on LCG, see below for more details.

Small cell 110 is shown to include an I/O 252, a CPU 254, a downstream transceiver 256, an upstream transceiver 257, a priority processor 258, a bulk request (REQ) module 259, and memory 260. I/O 252 may be any I/O system similar to that described for I/O 202. CPU 254 may be any processing unit similar to that described for CPU 104. Memory 260 may be any memory similar to that described for memory 220.

Downstream transceiver 256 may be any of, or a plurality of, wireless transceivers capable of wirelessly communication with the UEs 102(1)-(n) and other devices utilizing one or more compatible wireless communication protocols.

Upstream transceiver 257 is shown as a wireline communication unit. Alternatively upstream transceiver 257 may be a wireless transceiver for communicatively coupling with backhaul system 120, for example to modem 122. Upstream transceiver 257 utilizes a backhaul 120 compatible communication protocol. As such, small cell 110 may translate, repackage, and/or reorganize data received from one or more of UEs 102(1)-(n) into one or more backhaul compatible data units or streams. Furthermore, the present system and method may translate, repackage, and/or reorganize the data in concert with the present prioritized grant assignment system and method.

Priority processor 258 repackages data received from UEs 102, such as data 224(1)-(n), into prioritized based on logical channel groups. The functionality of priority processor 258 will be detailed further in the FIG. 2B and its associated description.

Figure 3:
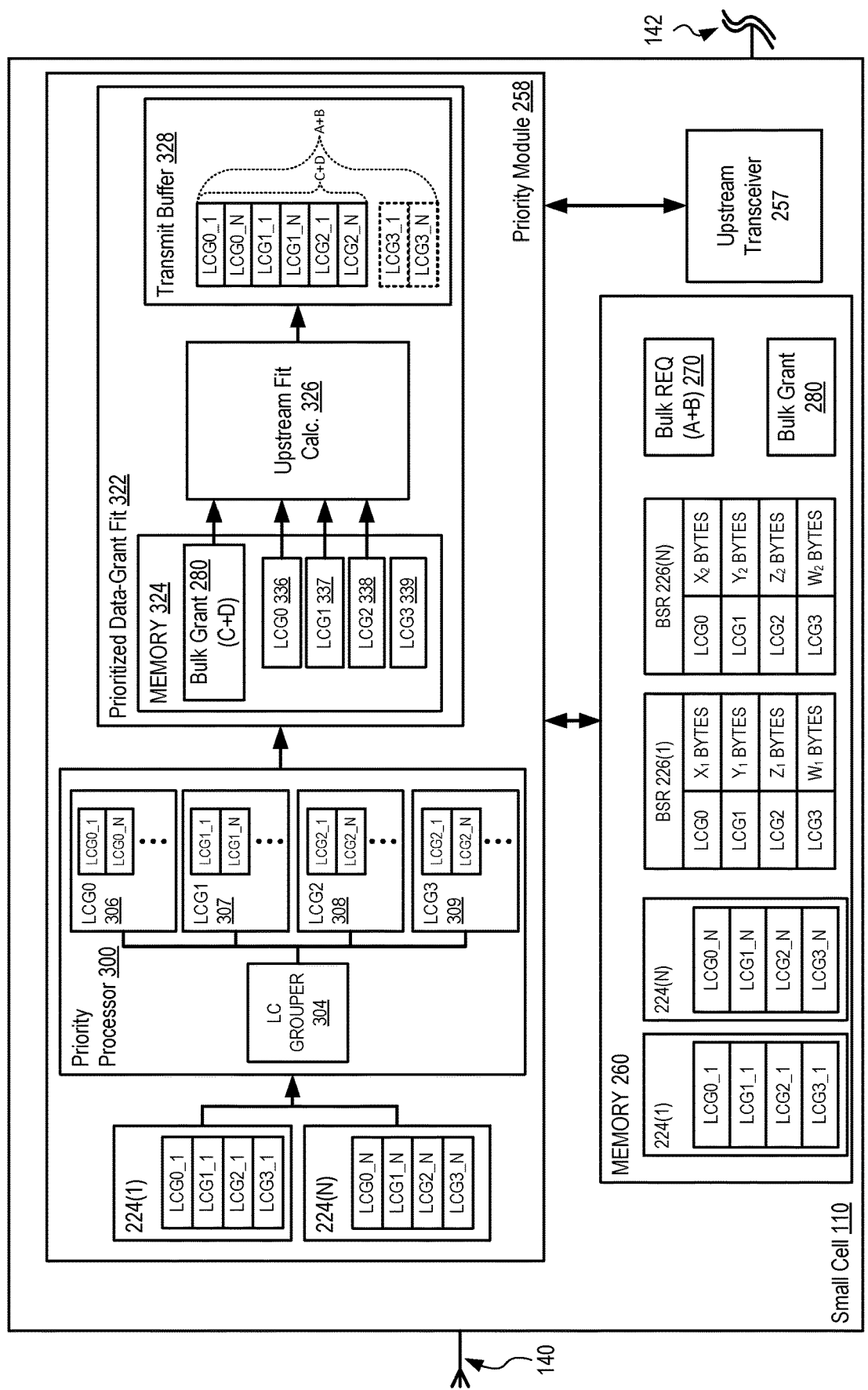
FIG. 3 shows one exemplary priority processing system configured within a small cell, which processes upstream data for transmission after the receipt of a partial grant, in and embodiment.
Figure 4A:
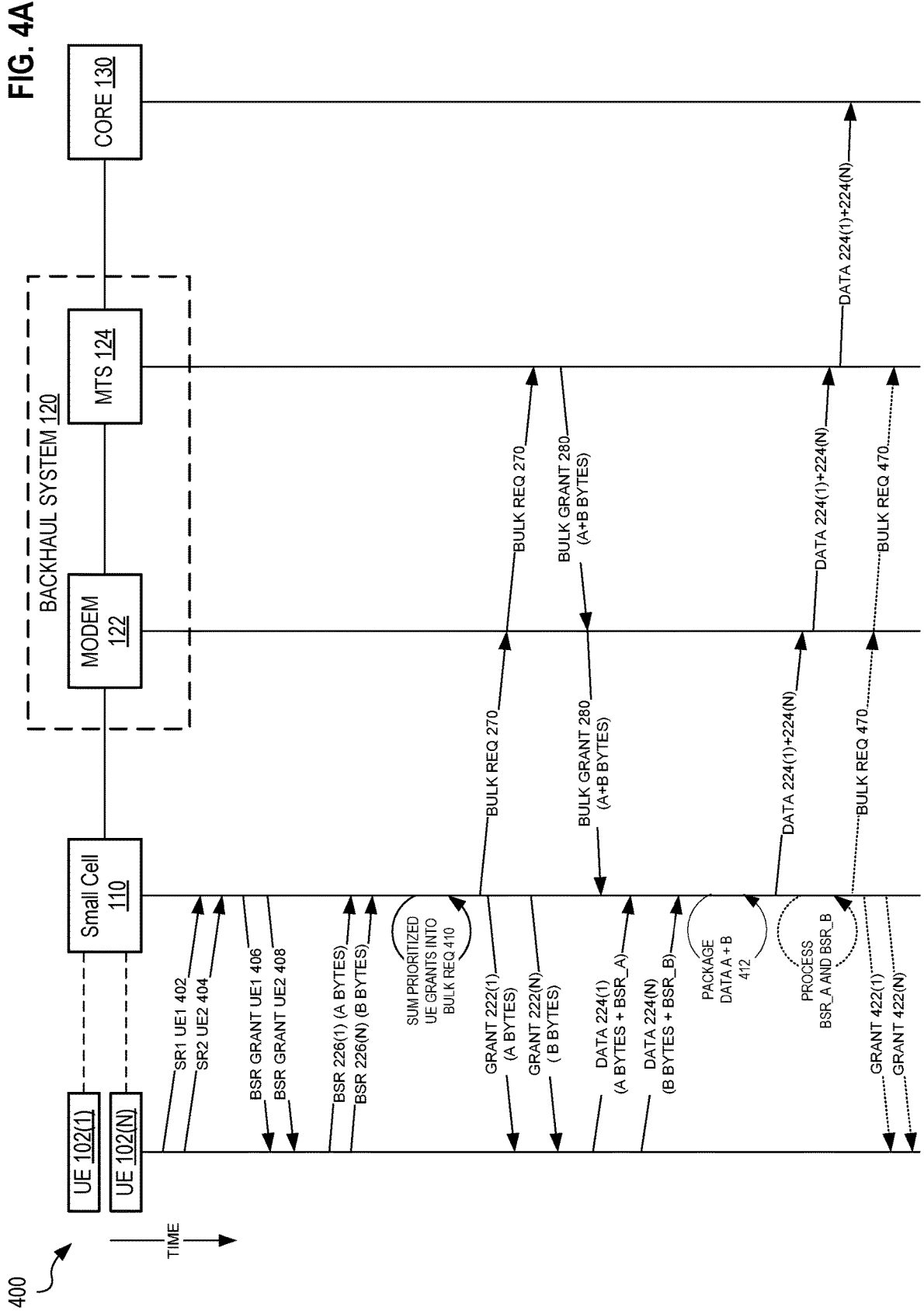
FIG. 4A is a communication diagram for the present grant assignment process wherein the entire request (REQ) is granted, in an embodiment.

Bulk REQ module 259 combines each BSR 226(1)-(n) received from UEs 102(1)-(n) into a single BSR, a bulk REQ 270, for transmission to backhaul system 120's MTS 124 which results in a backhaul grant to modem 122, discussed later. This ensures the backhaul system 120 is prepared to forward all or a portion of data 224(1)-(n) upon receipt at modem 122. MTS 124 processes bulk REQ 270 and, based on network parameters such as available capacity, rate limits based on Service Level Agreements for the UEs being serviced on the small cell, or prioritization of traffic of the small cell compared to other small cells provides small cell 110 a grant that accommodates all or a portion of the request for resources defined by bulk REQ 270. FIGS. 3 and 4A describe an instance where processing bulk REQ 270 results in a grant that completely satisfies the request. FIG. 4B describe an instance where processing bulk REQ 270 results in a grant that partially satisfies the request.

The remaining description for FIG. 2A will focus on UE 102(1), although it will be understood that the description is equally relevant to any of UEs 102(2)-102(n). UE 102(1) is shown having data 224(1), which is ready for transmission to core 130, stored in memory 220(1). As described above, BSR 226(1) is also stored in memory 220, describes data 224. In its most basic implementation, BSR 226(1) describes the amount of data in data 224, e.g., A bytes of data. In a more detailed embodiment, BSR 226(1) may describe the amount of data in each LCG0-LCG3. For example, data 224(1)'s LCG0 data may have $X_1$ bytes of data, LCG1 data may have $Y_1$ bytes of data, LCG2 data may have $Z_1$ bytes of data, and LCG3 data may have Wi bytes of data, such that $X_1+Y_1+Z_1+W_1=A$ bytes of data at a minimum. Upon receiving a grant to transmit it BSR 226(1), UE 102(1) sends BSR 226(1) to small cell 110 via wireless connection 140. Small cell 110 receives BSR 226(1) at downstream receiver 256 at which point it is moved to memory 260 as BSR 226(1). As described above, UE 102(n) utilizes the same process, which results in BSR 226(n) being stored in memory 260 with BSR 226(1).

Small cell 110 then process BSRs 226(1)-(n) to generate wireless grants 222(1) and 222(n) and sends these back to UEs 102(1) and 102(n) respectively.

Substantially close in time to the generation and transmission of wireless grants 222(1) and 222(n) to UE 102(1) and UE 102(n), respectively, bulk REQ module 259 takes BSR 226(1)-226(n) as inputs and combines them to produce bulk REQ 270. Bulk REQ 270 is then transmitted to MTS 124 in backhaul system 120 via upstream transceiver 257, communication link 142, and modem 122. MTS 124 processes bulk REQ 270 to produce bulk grant bulk grant 280 (see FIGS. 3 and 4A-4B). Bulk grant 280 is sent to small cell 110 via modem 122 and link 142. Bulk grant 280 may accommodate all or a portion of the data within data 224(1)-(n), depending on network resources available. As described above, this ensures the backhaul system 120 is prepared to forward the allotted amount of data 224(1)-(n) upon receipt at modem 122. Small cell 110 processes bulk grant 280 to ascertain the resources available to it.

If bulk grant 280 only provides resources for small cell 110 to transmit only a portion of data 222(1)-(n) then the present system and method operates to ensure the highest priority data, namely LCG0 data, is prioritized first, followed by LCG1, then LCG2, and finally LCG3. This will be discussed in more detail below.

In an embodiment, not shown here, the functionality and associated hardware and/or software described above for small cell 110 may alternatively be configured with and implemented by modem 122. That is, modem 122 may by formed with I/O 252, CPU 254, downstream transceiver 256, upstream transceiver 257, priority processor 258, bulk request (REQ) module 259, and memory 260 such that modem 122 performs the operations described above and below with modification that would be obvious to the skilled artisan. It will be understood that such an embodiment does not preclude modem 122 from being a virtualized modem 122, in whole or in part. Furthermore, it will be understood that a small cell 110 implementation does not preclude small cell 110 from also being a virtualized at least in part.

Figure 2B:
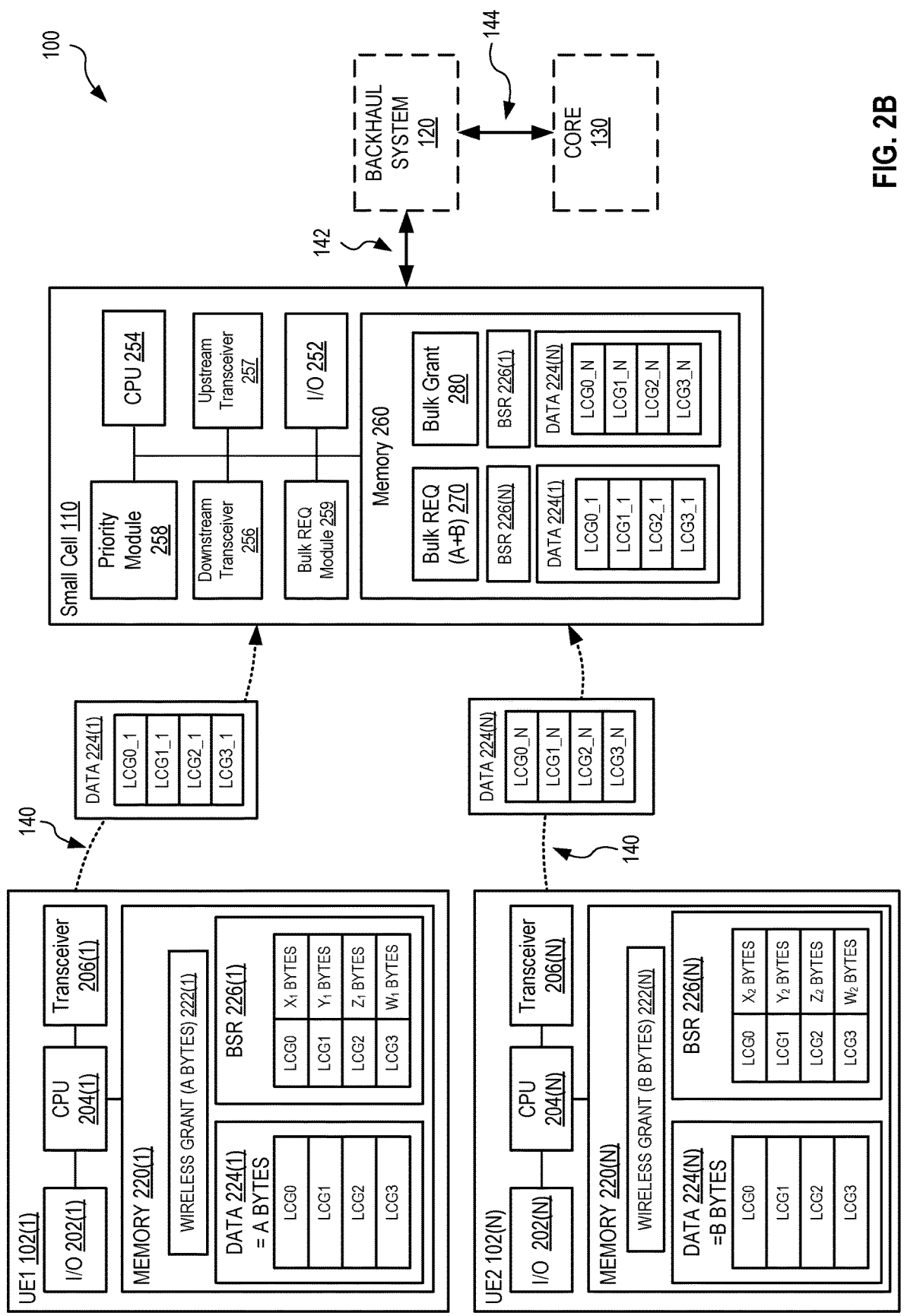
FIG. 2B is a more detailed view of the grant assignment system of FIGS. 1 and 2B processing multiple logical channel groups (LCGs) from a plurality of user equipment (UEs) based on prioritization, in an embodiment.

FIG. 2B shows system 100 of FIG. 2A after the receipt of wireless grant 222(1) and 222(n) at UES 102(1) and 102(n), respectively, and bulk grant 280 at small cell 110. Furthermore, system 100 of FIG. 2B is shown transmitting data 224(1) and (n) from UEs 102(1) and 102(n) to small cell 110. Data 224(1) and 224(n) are stored in memory 260. Because bulk grant 280 is in place when data 224(1)-(n) arrives at small cell 110 all or a portion of that data, depending on the grant, may be transmitted to core 130 vie backhaul system 120.

If bulk grant 280 can accommodate all of data 224(1) and 224(n), that is A bytes+B bytes, then no further processing is requires and data 224(1)-224(n) is transmitted to core 130 via backhaul system 120 utilizing standard methods of repackaging or translating wireless data 224(1)-224(n) in to a backhaul compatible container or data.

Alternatively, if bulk grant 280 cannot accommodate all of data 224(1)-224(n), then priority process 258 acts on data 224(1)-224(n), discussed in more detail in at least FIG. 3.

FIG. 3 shows one exemplary priority processing module 258 configured within small cell 110, which processes upstream data for transmission after the receipt of bulk grant 280, which is only a partial grant.

Priority module 258 is shown including a priority processor 300 and a prioritized data-grant fit module 320. Priority processing 258, priority processor 300, and prioritized data-grant fit module 320 may be implemented as a single combined device or component, as standalone devices, or may be implemented, separately or together, as functionality executed by CPU 254.

Priority processor 300 is represented to include a logical channel (LC) grouper 304 and LCG0 306-LCG3 309.

LCG0 306 is a buffer or temporary data storage for UE 102(1)-102(n)'s LCG0 data. LCG1 307 is a buffer or temporary data storage for UE 102(1)-102(n)'s LCG1 data. LCG2 308 is a buffer or temporary data storage for UE 102(1)-102(n)'s LCG2 data. LCG3 309 is buffer or temporary data storage for UE 102(1)-102(n)'s LCG3 data.

LC grouper 304 takes all data 224 at its input and stores, copies or otherwise records each UE 102's LCG data into the appropriate LCG0 306-LCG3 309 temporary storage. For example, LC grouper 304 process data 224(1) and data 224(n) and copies all LCG0 data to LCG0 306. That is, LC grouper 304 copies data 224(1)'s LCG0_1 data and data 224(n)'s LCG_N data in LCG0 306. LC grouper 304 similarly copies all data 224(1)'s and data 224(n)'s LCG1 data to LCG1 307, all data 224(1)'s and data 224(n)'s LCG2 data to LCG2 308, and all data 224(1)'s and data 224(n)'s LCG3 data to LCG3 309. CLG0 306-LCG3 309 are then copied to prioritized data-grant fit 322 as LCG0 336-LCG3 339.

Prioritized data-grant fit module 322 is shown to be configured with a memory 324, an upstream fit calculator (UFC) 326, and a transmit buffer 328. Memory 324 has stored with in it bulk grant 280 which was generated by MTS 124, and LCG0 336-LCG3 339. Bulk grant 280 of FIG. 3 is a grant for an amount of data equal to C+D bytes of data, which is a portion of that requested, namely A+B bytes of data. C+D bytes of data and A+B bytes of data are symbolically represented in transmit buffer 328, more on this below.

Transmit buffer is shown including LCG0_1, LCG0_N, LCG1_1, LCG1_N, LCG2_1, LCG2_N, LCG3_1, and LCG3_N. The size of LCG0_1, LCG0_N, LCG1_1, LCG1_N, LCG2_1, LCG2_N, LCG3_1, and LCG3_N is equal to A+B bytes, the size of the bulk REQ 270. The size of LCG0_1, LCG0_N, LCG1_1, LCG1_N, LCG2_1, and LCG2_N is equal to C+D bytes, the size of the bulk grant 280. C+D<A+B.

UFC 326 takes as inputs bulk grant 280 and LCG0 336, LCG1 337, LCG2 338, and LCG3 339. UFC 326 then process the LCG0 336, LCG1 337, LCG2 338, LCG3 339 data, and bulk grant 280 to determine which data can be accommodated by bulk grant 280 for the related transmission. This process may be as simple as determining the size of bulk grant 280 (C+D bytes) and perform arithmetic calculations to with LCG0, LCG1, LCG2, LCG3 in order of priority to determine which data packages can be accommodated by the bulk grant 280. Another exemplary process is a UE prioritization process, which may order LCG data based on Service Level Agreement or priority, such that if C+D bytes of data provided by bulk grant 480 is not sufficient to serve all UE logical channel group data, then LCG data is prioritized by UEs such that higher priority UEs have their data accommodated first. Furthermore UE prioritization may be multi-tiered such that LCG0 data from first priority UEs are handled first, then LCG0 data from second priority UEs are handled next, and so forth. In an embodiment, LCG1 data originating from a highest priority UE is handled before LCG0 data from a second tier UE. Determining the priority of UEs may be based on the type of device (e.g., emergency services devices autonomous vehicles have a higher priority than standard user devices and IoT devices), a user or user account associated with the device (e.g., a business or premium account versus an individual account or lower tier account, or military account versus a civilian account), order of association with the small cell, etc. Other processes are detail below.

In the embodiment of FIG. 3 bulk grant 280 may accommodate C+D bytes of data, which provides for the transmission of LCG0_1, LCG0_N, LCG1_1, LCG1_N, LCG2_1, and LCG2_N over backhaul system 120. LCG3_1 and LCG3_N may be shifted the next or subsequent bulk request and upstream transmission. Alternatively, LCG3_1 and LCG3_N may be dropped, for example, if that data is determined to be stale.

FIG. 4A is a communication diagram 400 for system 100 in the situation where all of a request conveyed by a Bulk REQ 270 is granted, in an embodiment. In the present embodiment two UEs are shown, UEs 102(1) and 102(n). As discussed above, it will be understood that more UEs may participate in the present system and method without departing from the scope here and only two are shown and described here to reduce complexity and increase understanding. FIG. 4A is best understood when read in combination with FIGS. 2A-B and 3.

In diagram 400 UEs 102(1) and 102(n) transmit service requests (SRs) SR1 UE1 402 and SR2 UE2 404 to small cell 110 to request a grant for the transmission of each UEs buffer status report (BSR), BSR 226(1) and BSR 226(n), see FIGS. 2A, 2B, and 3. Small cell 110 receives and processes SR1 UE1 402 and SR2 UE2 404, producing two BSR grants, BSR Grant UE1 406 and BSR Grant UE2 408, which are sent back to the respective UE. UE 102(1) and 102(n) receive and process the BSR grants 406, 408 and transmit BSR 226(1) and BSR 226(n). BSR 226(1) conveys to small cell 110 that UE 102(1) has A bytes of data in its buffer where and BSR 226(n) conveys to small cell 110 that UE 102(n) has B bytes of date in its buffer. A and B, which describe the A and B bytes of data, are numeric variables which designate the size or amount of data stored in the respective buffers. Small cell 110 processes BSR 226(1) and 226(n) and produces a grant for each UE 102, grant 222(1) and grant 222(n). In addition, small cell 110 generates bulk REQ 270. Bulk REQ 270 is a request for backhaul system 120 resources to transmit the combination of at least data 224(1) and 224(n) (or any data 224(1)-(n) if more UEs 110 are associated with small cell 110 and have data in their buffers to transmit). Small cell 110 transmits grants 222(1) and 222(n) to UEs 102(1) and 102(n), respectively, and bulk REQ 270 to MTS 124 via modem 122 within backhaul system 120. The order the UE Grants 222 and the bulk REQ 270 are produced and transmitted by small cell 100 may vary according to implementation as long as they occur substantially close enough in time such that a bulk grant, one example of which is bulk grant 280 as shown in FIGS. 2B, 3 and 4A, may be received and processed by small cell 110 prior to the receipt of data from the UEs, such as data 224(1)-(n) discussed in more detail below. Although not ideal, it will be consistent with the present invention if bulk grant 280 is received at small cell 110 after the receipt of data 224(1) and 224(n) at small cell 110 as long as it is not so long after that there is no reduction in latency over the serial grant assignment utilized in the prior art. Upon receipt of the grants 222(1) and 222(n), UE 102 (1) and UE 102(n) prepare data 224(1) and 224(n), respectively, for transmission.

In an embodiment, UEs 102(1) and 102(n) also include new BSRs in data 224(1) and 224(n), shown in diagram 400 as BSR_A and BSR_B. In such an embodiment grants 222(1) and 222(n) include additional resources to accommodate BSR_A and BSR_B. BSR_A and BSR_B are requests for resources to transmit new data in UE 102(a) and 102(n)'s buffers that was generated after the transmission of SR1 UE1 402 and SR2 UE2 404. This "piggy backing"

process reduces the need to go through the SR/BSR-grant process (described above) for the next and potentially subsequent data transmissions.

Upon receipt of data 224(1) and 224(n) and bulk grant 280 at small cell 110 the small cell packages 412 data 224(1) and 224(n), for example in a manner similar to that shown and described for FIG. 3, for transmission to core 130 via backhaul system 120. In an embodiment that includes BSR_A and BSR_B, small cell 110 may also process BSR_A and BSR_B in a similar fashion as described above for BSR 226(1) and 226(n), producing new grants 422(1) and 422(n) and a second bulk REQ 470.

This second bulk REQ 470 may be transmitted separately from (as shown in FIG. 4) or packaged with the upstream transmission of data 224(1) and 224(n) (not shown) to MTS 224 on its way to core 130. If second bulk REQ 470 is transmitted separately from the upstream transmission of data 224(1) and 224(n) to core 130, as shown is in FIG. 4, then BSR_A and BSR_B may be processed before or after the upstream transmission of data 224(1) and 224(n) from small cell 110 to core 130.

If the second bulk REQ 470 is sent with the upstream transmission of data 224(1) and 224(n) then bulk grant 280 must include additional resources to accommodate bulk REQ 470, that is bulk grant 280 must be capable of accommodating at least A bytes+B bytes+X bytes, where X bytes is at least the amount of data need to accommodate bulk REQ 470, e.g., a summary of BSR_A and BSR_B. With bulk REQ 470 sent with or proximate in time to the upstream transmission of data 224(1) and 224(n), MTS 124 may read or extract bulk REQ 470 upon receipt of the upstream transmission of data 224(1), data 224(n), and the bulk REQ 470. Bulk REQ 470 may be packaged with data 224(1) and 224(n) such that MTS 124 can only read bulk REQ 470, which utilizes a backhaul 120 format or protocol, and MTS 124 may not read data 224(1) and 224(n), which utilizes a core 130 format or protocol different from that of backhaul 120's format or protocol.

FIG. 4B is a communication diagram 450 for the present grant assignment process wherein only a portion of the request conveyed by a Bulk REQ is granted, in an embodiment.

Communication diagram 450 is similar to communication diagram 400 up until the receipt of bulk REQ 270 by MTS 124 from small cell 110. As such all steps prior to the receipt of bulk REQ 270 by MTS 124 in diagram 450 are not described here for the sake of brevity. Diagram 450 differs from diagram 400 in that MTS 124 processes the received bulk REQ 270 to produce a bulk grant 480 which accommodates less data than that requested in bulk REQ 270. That is diagram 450 shows a scenario where backhaul system 120 can only accommodate a portion of bulk REQ 270, which requests resources to transmit A+B bytes of data. Thus MTS 124 generates a bulk grant 480, similar to bulk grant 280 of FIG. 3, which accommodates C+D bytes of data, which is less A+B bytes: (C+D<A+B).

Bulk grant 480 is transmitted to small cell 110 via modem 122. Substantially concurrently to the transmission and processing of bulk REQ 270 and generation of bulk grant 480, UEs 102(1) and 102(n) process grants 222(1) and 222(n), prepare data 224(1) and 224(n) and optionally new BSRs BSR_A and BSR_B, and transmits these to small cell 110, as similarly described from diagram 400, FIG. 4A.

As similarly described in FIG. 3, small cell 110 performs a logical channel grouping process ad prioritized grant fit process as described in FIG. 3. That is, the priority processor 300 groups together all LCG 0 data from each UE 102's data 224, all LCG1 data from each UE 102's data 224, etc. The prioritized data-grant fit 322 unit the fits the LCG data to the bulk grant 280, 480 such that data with the highest priority, LCG0 Data, is prioritized for transmission, followed by LCG1, LCG2, etc. In the situation of FIG. 4B (and FIG. 3) not all data can be transmitted under bulk grant 480, namely LCG3_1 and LCG3_N data. As such, LCG3_1 and LCG3_N data are subsequently retained in the transmit buffer 328, memory 260, or a similar generic or dedicated memory, which may or may not be shown.

The remaining LCG data is then packaged 454 and transmitted to mobile core 130 via modem 122 and MTS 124 of backhaul system 120. Optionally, and as similarly described for FIG. 4A, small cell 110 may also process new BSRs, BSR_A and BSR_B, and provide grants 422(1) and 422(n) to UEs 102(1) and 102(n).

Figure 5A:
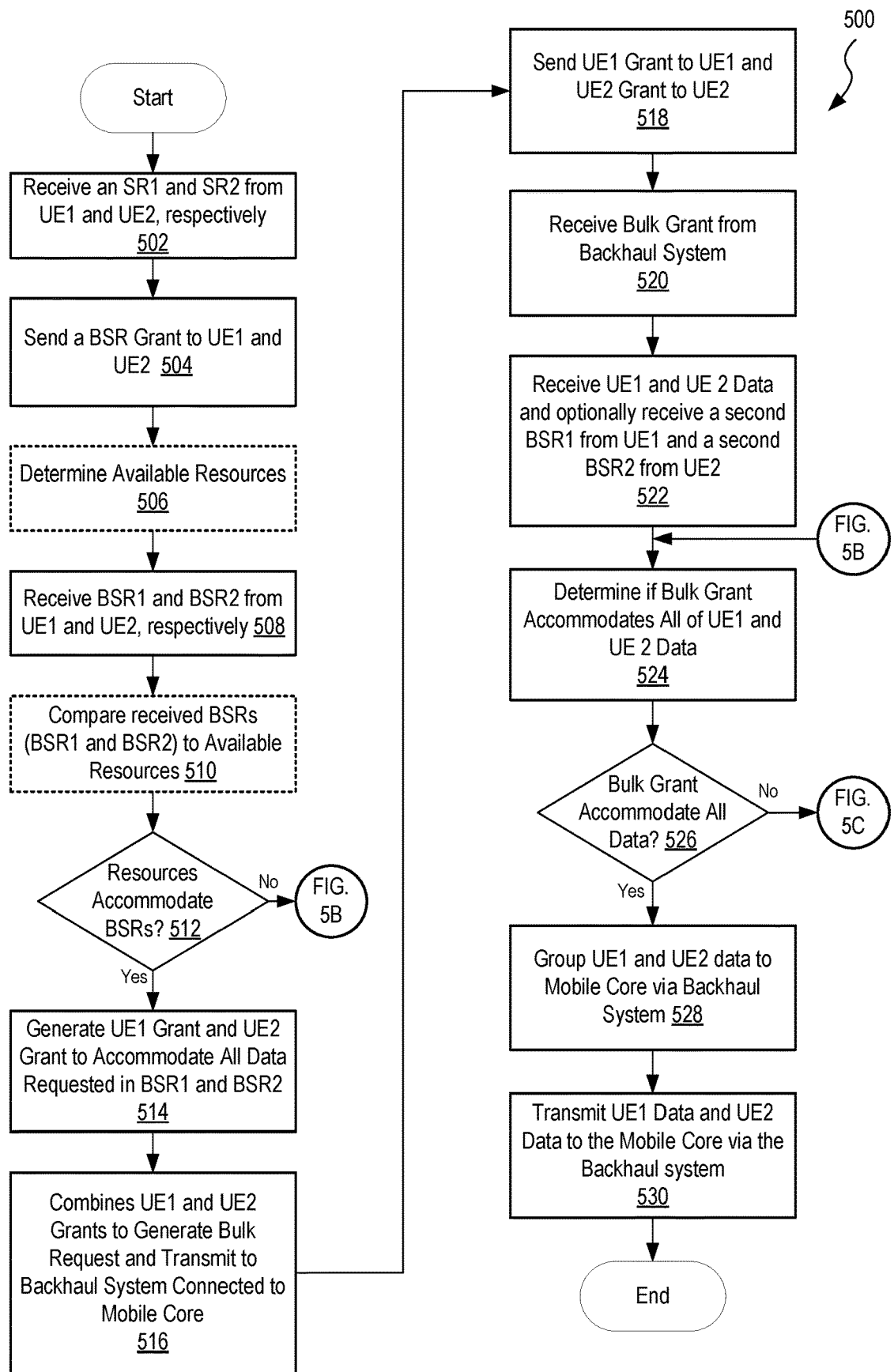
Figure 5B:
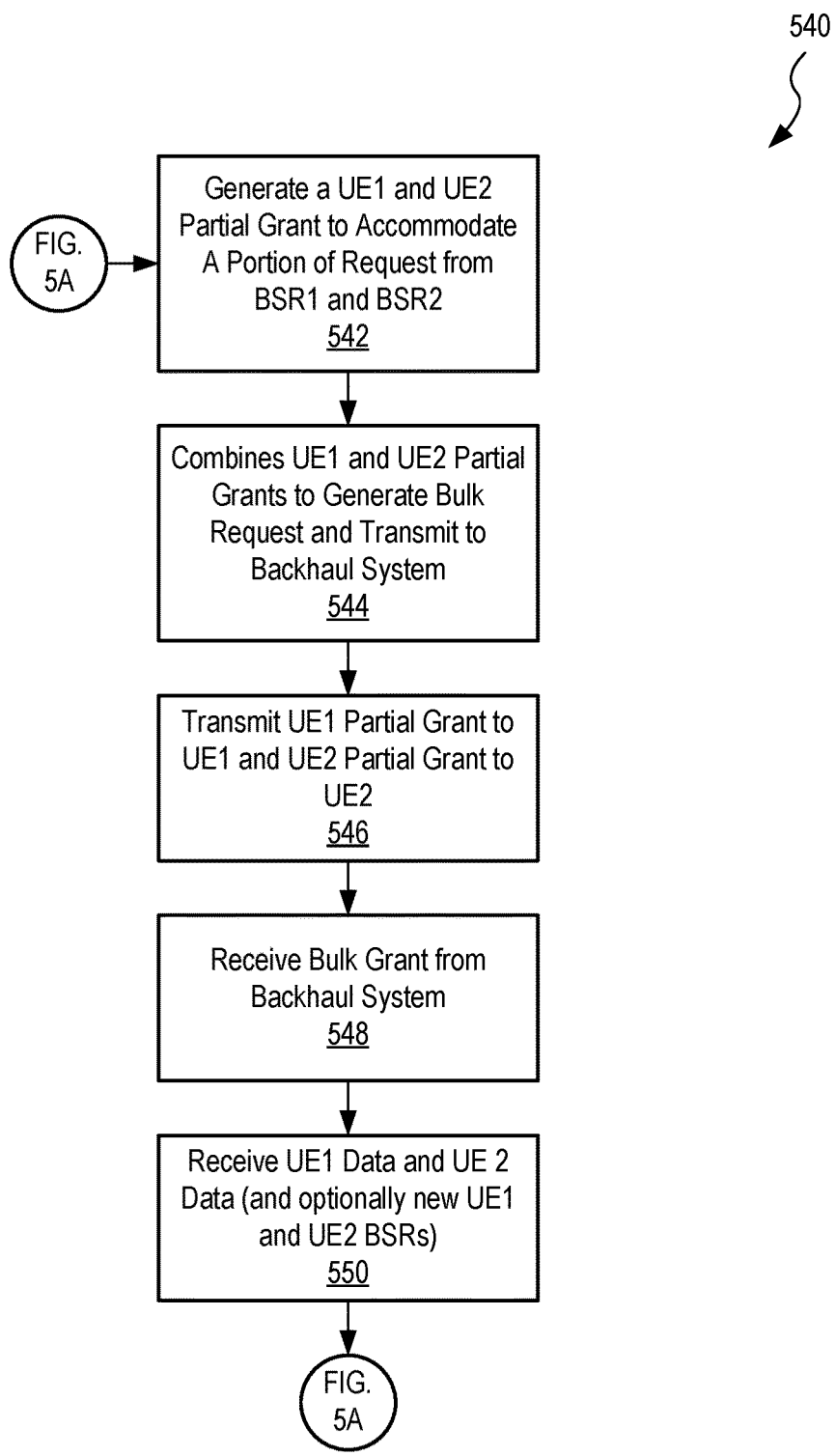
Figure 5C:
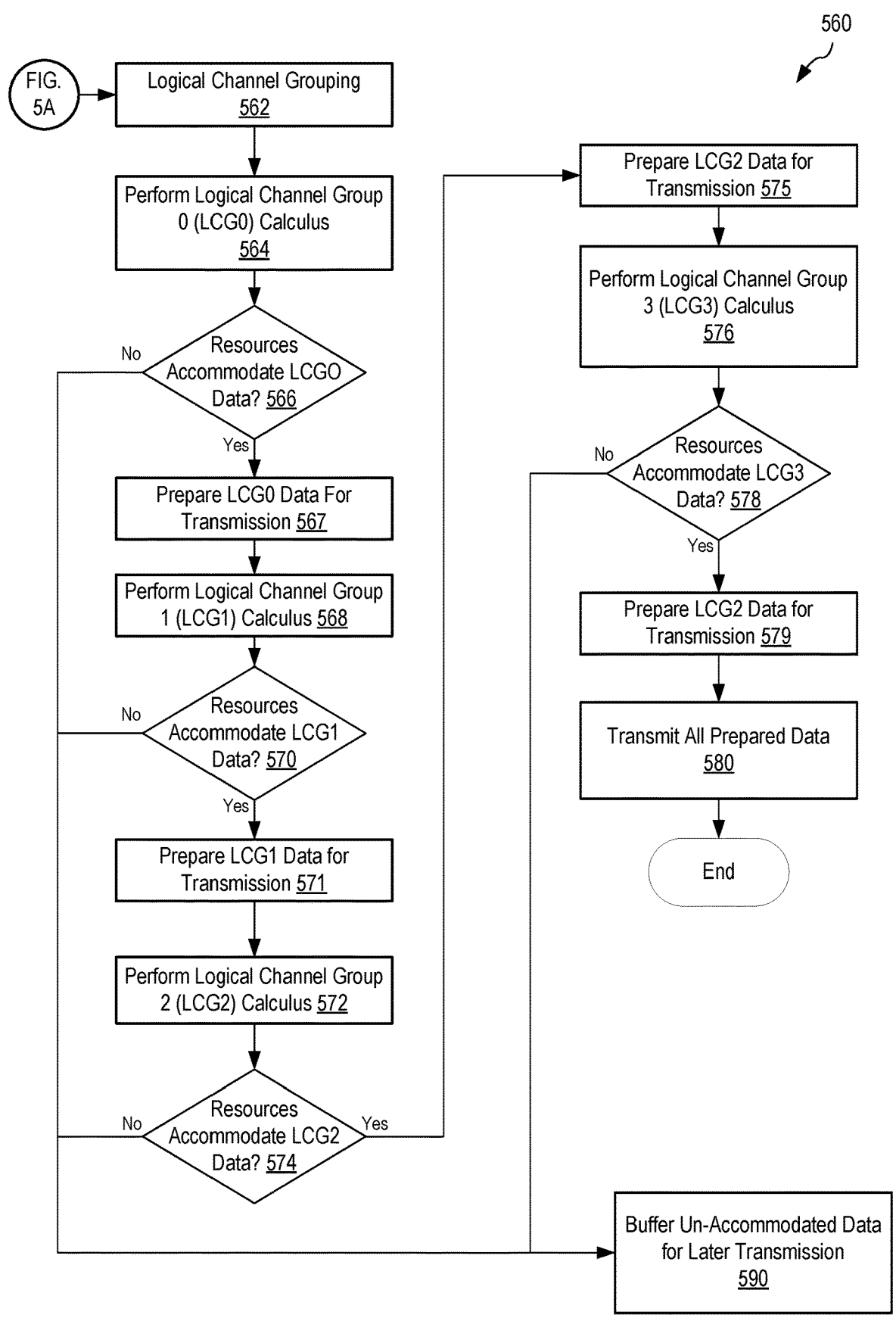

FIGS. 5A-C describe a method 500 detailing one exemplary process for generating a bulk request for resources, in an embodiment. FIGS. 5A-C are best viewed together.

Step 502 of method 500 receives an SR1 and an SR2 from UE1 and UE2, respectively. An example of step 502 is UEs 102(1) and 102(n) transmitting SR1 UE1 402 and SR2 UE2 404 to small cell 110, as shown and described in FIGS. 4A and 4B.

Step 504 of method 500 sends a BSR Grant to both UE1 and UE2. An example of step 504 is small cell 110 transmitting BSR grant UE1 406 and BSR grant UE2 408 to UE 102(1) and UE 102(n), respectively.

Optional step 506 of method 500 determines what resources are available to small cell in preparation for processing the forthcoming BSRs from the UEs. An example of step 506 is small cell 110 analyzing its available resource for comparison to the BSRs received from UEs 102(1) and 102(n) in step 508-510.

Step 508 of method 500 receives BSR1 and BSR2 from UE1 and UE2, respectively. An example of step 508 is small cell 110 receiving BSR 226(1) and 226(n) from UEs 102(1) and 102(n), respectively.

Optional step 510 of method 500 compares the optional step 506 determined available resources to the step 508 received BSRs (BSR1 and BSR2) to determine if the small cell has resources to accommodate the UE requests. An example of step 510 is small cell comparing its predetermined available resources with the received BSRs 226(1) and 226(n) to determine if resources are available and when they are available.

Decision step 512 of method 500 determines if and when resources are available to accommodate the BSRs. If resources are available method 500 moves to step 514. If resources are not available, method 500 moves to step 542 of FIG. 5B, described below. An example of step 512 is small cell 110 producing a result as to the available resources and acting on that result by initiating either the process of step 514 or 540, FIG. 5B.

Step 514 of method 500 generates a UE1 Grant and a UE2 Grant to accommodate all data requested by BSR1 and BSR2. An example of step 514 is small cell 110 producing a grant 222(1) for UE 102(1) and a grant 222(n) for UE 102(n).

Step 516 of method 500 combines all grants, e.g., UE1 grant and UE2 grant, to generate a bulk backhaul request and transmits the bulk backhaul request to the processing aspect of the backhaul system. An example of step 516 is small cell 110 combining grants 222(1) and 222(n) as described, for example, in FIGS. 3 and 4A and 4B, to produce and transmit bulk REQ 270 to MTS 124 via modem 122. It will be understood that other backhaul components may be involved in the process, for example, if alternative backhaul systems are used, e.g., any backhaul system that relies on a request grant protocol.

Step 518 of method 500 sends UE1 grant to UE1 and UE2 grant to UE2. An example of step 518 is small cell 110 transmitting grant 222(1) and 222(n) to UE 102(1) and 102(N), respectively.

Step 520 of method 500 receives bulk grant from backhaul system. An example of step 520 is MTS generating a bulk grant 280 is then received by small cell 110 from MTS 124 via modem 122.

Step 522 of method 500 receives UE1 and UE 2 data and optionally receive a second BSR1 from UE1 and a second BSR2 from UE2. An example of step 520 is small cell 110 receiving data 224(1) and 224(n) from UEs 102(1) and 102(n), respectively. Optionally, small cell 110 may also receive a new BSR from UE 102(1), BSR_A, and a new BSR from UE 102(n), BSR_B.

Step 524 of method 500 process bulk grant and bulk request to determine if the bulk grant accommodates all of UE1 and UE 2 Data. An example of step 522 is small cell 100 determining if the bulk grant received in step 520 satisfies the bulk REQ 270, sent is step 516.

Decision step 526 of method 500 provides a decision based on the results of step 524, determining if the bulk grant accommodates all of UE1 and UE 2 Data. If it is determined that the bulk grant does not accommodate all of the data described in the bulk request, decision method 500 moves to step 550 of FIG. 5C, described further below. If step 526 determines that the bulk grant satisfies the bulk request, then method 500 moves to step 528. An example of step 524 is small cell 110 processing the result of a comparison between the bulk grant and the bulk request.

Step 528 of method 500 groups UE1 data and UE2 data for transmission to the mobile core via backhaul system. One example of step 528 is small cell 110 packaging data A+B 412, as described in FIG. 4A.

Step 530 of method 500 transmits UE1 Data and UE2 Data to the Mobile Core via the Backhaul system. One example of step 530 is small cell 110 transmitting data 224(1)+224(n) to mobile core via modem 222, MTS 224, and core 130, as described in FIG. 4A.

FIG. 5B shows a method 540, which branches from step 512 of method 500, FIG. 5A, for handling a partial small cell grant.

In step 542 method 540 generate a UE1 and UE2 partial grant to accommodate a portion of the request resources as described in BSR1 and BSR2. One example of step 542 is small cell processing the results of step 506 and BSR 226(1) and BSR 226(n) to generate a partial grant for BSR 226(1) and a partial grant for BSR 226(n).

In step 544 method 540 combines UE1 and UE2 partial grants to generate bulk request and transmits the bulk request to the backhaul system for processing. One example of step 544 is small cell 110 combining partial grants (not shown) to produce a bulk request, similar to bulk REQ 270, and transmitting it to MTS 124 via modem 122.

In Step 546 method 540 transmits the partial grants, generated in step 542, to UE1 UE2. One example of step 546 is small cell 110 transmitting partial grants, similar to grants 222(1) and 222(n), to UEs 102(1) and 102(n).

In step 548 method 540 receives a bulk grant from the backhaul system. Noe example of step 548 is small cell 110 receives a bulk grant, similar to bulk grant 280 of FIG. 4A, from MTS 124 via modem 122.

In step 550 method 540 receive data and optionally new BSRs from the UEs. One example of step 550 is small cell 110 receiving data, similar to data 224(1) and 224(n) from UEs 102(1) and 102(n). Method 540 then moves to step 524 of FIG. 4Basdfasdfsaf FIG. 5B shows a method 560, which branches from step 526 of method 500, FIG. 5A, for handling a partial backhaul grant.

In step 562 method 560 performs a logical channel grouping by grouping together all UE data by Logical Channel Group (LCG) such that, for example, all UE1-UEn data designated as Logical Channel Group 0 (LCG0) are grouped together, all UE1-UEn data designated as Logical Channel Group 1 (LCG1) are grouped together, etc. One example of step 562 LC grouper 304 taking in data 224(1) and 224(n) and placing LCG0_1 data with LCG0_n data in LCG0 306, placing LCG1_1 data with LCG1_n data in LCG1 307, placing LCG2_1 data with LCG2_n data in LCG2 308, placing LCG3_1 data with LCG3_n data in LCG3 309, as described in FIGS. 3 and 4B. Alternatively, metadata describing LCG0-LCG3 may be grouped together or otherwise organized for analysis in the later steps of method 560 to determine what LCG data the grant may accommodate.

In step 564 method 560 performs an upstream fit calculus by analyzing if the bulk grant can accommodate the LCG0 data. Method 560 then moves to decision step 566 where method 560 makes a decision based on the result of step 564. If the bulk grant cannot accommodate all of the LCG0 data then method 560 moves to step 590, where method 560 buffers any un-accommodated LCG data for later transmission.

Alternatively, if the bulk grant cannot accommodate all of the LCG0 data then method 560 may perform a second analysis (not shown) to determine if the bulk grant can accommodate LCG0 data from a UE in order of priority. For example, UE1 (e.g., a medical device) may have a higher priority than UE2 (e.g., a gaming device) such that if the bulk grant cannot accommodate all of LCG0 data (e.g., UE1 LCG0 data plus UE2 LCG0 data) then method 560 may determine if the bulk grant can accommodate LCG0 data from high priority UE1 only. If the bulk grant can only accommodate UE1 LCG0 data, then method 560 moves UE2 LCG0 data to step 590, buffering it for later transmission and UE1 LCG0 data is moved through the rest of method 560 or just prepared for transmission if the bulk grant cannot accommodate any other data. Although it will not be repeated again, the above alternative process may be included with any similar steps described below.

If it is determined in step 566 that the bulk grant can accommodate all of the LCG0 data then decision step 566 moves to step 567.

In step 567 method 560 prepares the LCG0 data for transmission. One example of step 567 is LCG0_1 and LCG0_n data sent to transmit buffer 328, FIG. 3.

In step 568 method 560 performs an upstream fit calculus by analyzing if the bulk grant can accommodate the LCG1 data. Method 560 then moves to decision step 570 where method 560 makes a decision based on the result of step 568. If the bulk grant cannot accommodate all of the LCG1 data then method 560 moves to step 590, where method 560 buffers any un-accommodated LCG data for later transmission. If it is determined in step 570 that the bulk grant can accommodate all of the LCG1 data then decision step 570 moves to step 571.

In step 571 method 560 prepares the LCG1 data for transmission. One example of step 571 is LCG1_1 and LCG1_n data sent to transmit buffer 328, FIG. 3.

In step 572 method 560 performs an upstream fit calculus by analyzing if the bulk grant can accommodate the LCG2 data. Method 560 then moves to decision step 574 where method 560 makes a decision based on the result of step 572. If the bulk grant cannot accommodate all of the LCG2 data then method 560 moves to step 590, where method 560 buffers any un-accommodated LCG data for later transmission. If it is determined in step 574 that the bulk grant can accommodate all of the LCG1 data then decision step 574 moves to step 575.

In step 575 method 560 prepares the LCG2 data for transmission. One example of step 575 is LCG2_1 and LCG2_n data sent to transmit buffer 328, FIG. 3.

In step 576 method 560 performs an upstream fit calculus by analyzing if the bulk grant can accommodate the LCG3 data. Method 560 then moves to decision step 578 where method 560 makes a decision based on the result of step 576. If the bulk grant cannot accommodate all of the LCG3 data then method 560 moves to step 590, where method 560 buffers any un-accommodated LCG data for later transmission. If it is determined in step 578 that the bulk grant can accommodate all of the LCG3 data then decision step 578 moves to step 579.

In step 579 method 560 prepares the LCG3 data for transmission. One example of step 579 is LCG3_1 and LCG3_n data sent to transmit buffer 328, FIG. 3.

In step 580 all data that can be accommodated by the bulk grant is sent, via the backhaul system to its destination, e.g., a mobile or Wi-Fi core.

It is not necessary that the steps described here for method 560 be performed in the order described. For example, all processing steps may be performed prior to all decision steps. Furthermore, additional steps may be included that are not shown. For example, the method and associated system may package any buffered un-accommodated data such that the packaged data may be easily added to a forth coming backhaul bulk request. The method and associated system may also monitor the portions of data within the buffered un-accommodated data to determine if any of that data has become "stale." Any stale data may be removed and the remaining data may be repackaged so it may be added to any forth coming backhaul bulk request.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method to group a User Equipment 1 (UE1) data and a User Equipment 2 (UE2) data for prioritized transmission over a network, comprising:
   receiving the UE1 data and the UE2 data over a first network and a bulk grant over a second network;
   processing the UE1 data to isolate a UE1 first priority data and a UE1 second priority data;
   processing the UE2 data to isolate a UE2 first priority data and a UE2 second priority data;
   combining UE1 first priority data with UE2 first priority data to form a combined first priority data;
   combining UE1 second priority data with UE2 second priority data to form a combined second priority data;
   determining the amount of data that can be accommodated by the bulk grant; and
   fitting at least a portion of the combined first priority data into a transmit buffer based on the determined amount of data that can be accommodated by the bulk grant.

2. The method of claim 1, further comprising fitting at least a portion of the combined second priority data into a transmit buffer based on the determined amount of data that can be accommodated by the bulk grant.

3. The method of claim 1, wherein first priority data is Logical Channel Group 0 (LCG0) data.

4. The method of claim 1, wherein second priority data is Logical Channel Group 1 (LCG1) data.

5. The method of claim 1, further comprising:
   processing the UE1 data to separate a UE1 third priority data from the UE1 first and second priority data;
   processing the UE2 data to separate a UE2 third priority data from the UE2 first and second priority data; and
   combining UE1 third priority data with UE2 third priority data to form a combined third priority data.

6. The method of claim 5, wherein the third priority data is Logical Channel Group 3 (LCG3) data.

7. A data priority module for prioritizing data for x-hauling first network data via a second network, comprising:
   a priority processor configured to accept at an input a first User Equipment (UE) data and a second UE data each arranged into a level one priority data and a level two priority data, the priority processor composed to group together level one priority data from the first and second UEs into a combined level one priority data and second UEs and the level two priority data from the first and second UEs into a combined level two priority data;
   a prioritized data grant fit module configured to accept at an input a bulk grant generated at the second network and the combined level one priority data and the combined level two priority data; and
   an upstream fit calculator in communication with the prioritized data grant fit module and configured to process the bulk grant and determine the fit of the combined level one priority data and level two priority data for upstream second network transmission;
   wherein the bulk grant, the combined level one priority data, and the combined level two priority data are provided by the prioritized data grant fit module to the upstream fit calculator for processing.

8. The method of claim 7, wherein first network data is an Long Term Evolution (LTE) network.

9. The method of claim 8, wherein the level one priority data is Logical Channel Group 0 (LCG0) data and level two priority data is Logical Channel Group 1 (LCG1) data.

10. The method of claim 7, wherein second network data is a DOCSIS network.

11. The method of claim 7, wherein second network data is an optical network.

12. The method of claim 7, wherein a logical grouper within the priority processor groups together level one priority data from the first and second UEs into a combined level one priority data and second UEs and the level two priority data from the first and second UEs into a combined level two priority data.

13. The method of claim 7, further comprising a transmit buffer arranged to accept and store first transmission data and second transmission data.

14. The method of claim 13, wherein first transmission data is data fit to the bulk grant for immediate transmission across the second network.

15. The method of claim 13, wherein second transmission data is data that does not fit the bulk grant and held in for later transmission across the second network.

* * * * *